(12) United States Patent
Ringeisen et al.

(10) Patent No.: US 8,101,247 B2
(45) Date of Patent: Jan. 24, 2012

(54) SUB-MICRON LASER DIRECT WRITE

(75) Inventors: Bradley R Ringeisen, Lorton, VA (US);
Christina M. Othon, Arcadia, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 857 days.

(21) Appl. No.: 12/141,954

(22) Filed: Jun. 19, 2008

(65) Prior Publication Data

US 2008/0314881 A1    Dec. 25, 2008

Related U.S. Application Data

(60) Provisional application No. 60/944,887, filed on Jun. 19, 2007.

(51) Int. Cl.
*C23C 14/30* (2006.01)
*C23C 14/28* (2006.01)
*B05D 3/00* (2006.01)

(52) U.S. Cl. .................... 427/596; 427/597; 219/121.69; 219/121.77

(58) Field of Classification Search ............... 219/121.6, 219/121.77, 121.85, 121.68, 121.69, 121.75; 438/22, 597, 612; 359/618–623, 626; 427/553–556, 427/582–584, 595–597
See application file for complete search history.

(56) References Cited

U.S. PATENT DOCUMENTS

| 3,787,210 | A | | 1/1974 | Roberts |
| 4,081,653 | A | | 3/1978 | Koo et al. |
| 4,970,196 | A | | 11/1990 | Kim et al. |
| 5,173,441 | A | | 12/1992 | Yu et al. |
| 5,292,559 | A | * | 3/1994 | Joyce et al. .................... 427/597 |
| 5,492,861 | A | * | 2/1996 | Opower ........................ 438/478 |
| 5,928,207 | A | * | 7/1999 | Pisano et al. .................. 604/272 |
| 6,300,638 | B1 | * | 10/2001 | Groger et al. ............. 250/458.1 |
| 6,433,303 | B1 | | 8/2002 | Liu et al. |
| 6,623,894 | B2 | * | 9/2003 | Pierson ............................ 430/5 |
| 6,845,120 | B2 | * | 1/2005 | Border et al. ................. 372/107 |
| 7,211,166 | B2 | * | 5/2007 | Chen et al .................. 156/272.8 |
| 7,633,035 | B2 | * | 12/2009 | Kirmeier .................. 219/121.69 |
| 2006/0188697 | A1 | * | 8/2006 | Lee ................. 428/156 |

OTHER PUBLICATIONS

Bohandy et al., "Metal deposition from a supported metal film using an excimer laser" J. Appl. Phys., 60(4), 1538-1539 (1986).
Ebbesen et al., "Extraordinary optical transmission through sub-wavelength hole arrays" Nature, 391, 667-669 (1998).
Heltzel et al., "Analytical and Experimental Investigation of Laser-Microsphere Interaction for Nanoscale Surface Modification" Journal of Heat Transfer, 127, 1231-1235 (2005).

(Continued)

*Primary Examiner* — Samuel M Heinrich
(74) *Attorney, Agent, or Firm* — Amy L. Ressing; Joseph T. Grunkemeyer (57) ABSTRACT

A method of directing a pulse of laser energy though a workpiece. The workpiece has: a substrate that transmits the laser energy; focusing elements on a surface of the substrate proximal to the laser that focus the laser energy; and a coating on the substrate distal to the laser that absorbs a portion of the laser energy. Each focusing element focuses the laser energy to a point that removes or ablates a portion of the coating from the substrate to produce a hole in the coating.

26 Claims, 6 Drawing Sheets

OTHER PUBLICATIONS

Heltzel et al., "Nanostructuring Borosilicate Glass With Near-Field Enhanced Energy Using a Femtosecond Laser Pulse" Journal of Heat Transfer, 129, 53-59 (2007).

Huang et al., "Laser Writing of Nanostructures on Magnetic Film Surfaces With Optical Near Field Effects" Mat. Res. Soc. Symp. Proc., 697, P5.14.1-P5.14.6 (2002).

Huang et al., "Nanostructures fabricated on metal surfaces assisted by laser with optical near-field effects" Appl. Phys. A, 77, 293-296 (2003).

Huang et al., "Focusing of light by a nanohole array" Appl. Phys. Lett., 90, 091119 (2007).

Kántor et al., "Metal pattern deposition by laser-induced forward transfer" Applied Surface Science, 86, 196-201 (1995).

Landström et al., "Single-step patterning and the fabrication of contact masks by laser-induced forward transfer" Appl. Phys. A, 78, 537-538 (2004).

Micheletto et al., "A Simple Method for the Production of a Two-Dimensional, Ordered Array of Small Latex Particles" Langmuir, 11, 3333-3336 (1996).

Zergioti et al., "Microdeposition of metal and oxide structures using ultrashort laser pulses" Appl. Phys. A, 66, 579-582 (1998).

Zhou et al., "Nanopatterning mask fabrication by femtosecond laser irradiation" Journal of Materials Processing Technology, 192-193, 212-217 (2007).

Zhou et al., "Near-field enhanced femtosecond laser nano-drilling of glass substrate" Journal of Alloys and Compounds, 449, 246-249 (2008).

PCT Search Report and Written Opinion (Sep. 16, 2008).

Chrisey et al., Appl. Surf. Sci., 154-155, 593-600 (2000).

Piglmayer et al., Appl. Phys. Lett., 80, 4693-4695 (2002).

* cited by examiner

SUB-MICRON LASER DIRECT WRITE

This application claims priority to U.S. Provisional Patent Application No. 60/944,887, filed on Jun. 19, 2007. This application and all other publications and patent documents referenced throughout this application are incorporated herein by reference.

FIELD OF THE INVENTION

The invention is generally related to laser transfer processes.

DESCRIPTION OF RELATED ART

Submicron device fabrication is important for many commercial, military, and homeland security applications. Many different fabrication techniques can be used to create complex optoelectronic, chem/biosensors, and electromechanical devices. However, the techniques used in fabrication of these devices are frequently not mutually compatible with traditional CMOS fabrication techniques. Traditional silicon manufacturing technology includes multiple exposures to high temperatures (450-1000 K), reactive ion etching, and photolithography. These environmental exposures can destroy the delicate ceramic oxides and polymer layers associated with optoelectronic and electromechanical devices. In order to combine these devices onto chips for complex sensing systems new affordable integration techniques are needed. By using an end of the line integration technique, the manufacturer can avoid contamination and stress/strain damage common during CMOS fabrication.

Laser induced forward transfer (LIFT) is a direct write technique in which a laser ablates a thin film of material off a transparent support onto a receiving substrate. The technique was disclosed by Bohandy et al. "Metal deposition from a supported metal film using an excimer laser," *J. of Appl. Phys.* 60(4), 1538-1539 (1986). LIFT has been used to successfully deposit materials of diverse physical properties including biologicals, (Barron et al., "Biological Laser Printing: A Novel Technique for Creating Heterogeneous 3-dimensional Cell Patterns," *Biomedical Microdevices* 6(2), 139-147 (2004); Ringeisen et al., "Laser Printing of Pluripotent Embryonal Carcinoma Cells," *Tissue Engineering* 10(3/4), 483-491 (2004)), metals (Bahnisch et al., "Single-shot, high repetition rate metallic pattern transfer," *Microelectron. Eng.* 50(1-4), 541-546 (2000); Kantor et al., "Metal pattern deposition by laser-induced forward transfer," *Applied Surface Science* 86, 196-201 (1995); Yamada et al., "Optimization of laser-induced forward transfer process of metal thin films," *Applied Surface Science* 197-198, 411-415 (2002); Zergioti et al., "Microdeposition of metal and oxide structures using ultrashort laser pulses," *Applied Physics a-Materials Science & Processing* 66(5), 579-582 (1998)), and oxides (Zergioti et al., "Laser microprinting of $InO_x$ active optical structures and time resolved imaging of the transfer process," *Applied Surface Science* 197, 868-872 (2002)) on the microscale. The transfer process is completely independent of the film formation techniques, meaning that structures can be pre-patterned or modified prior to transfer. LIFT is a maskless patterning technique, therefore patterning can be conducted using materials that are reactive or biological materials which would be damaged by traditional lithography techniques. In addition, LIFT is an additive deposition process, allowing the user to add delicate or reactive multilayer and multi-material structures to standard CMOS circuitry.

Figure 1:
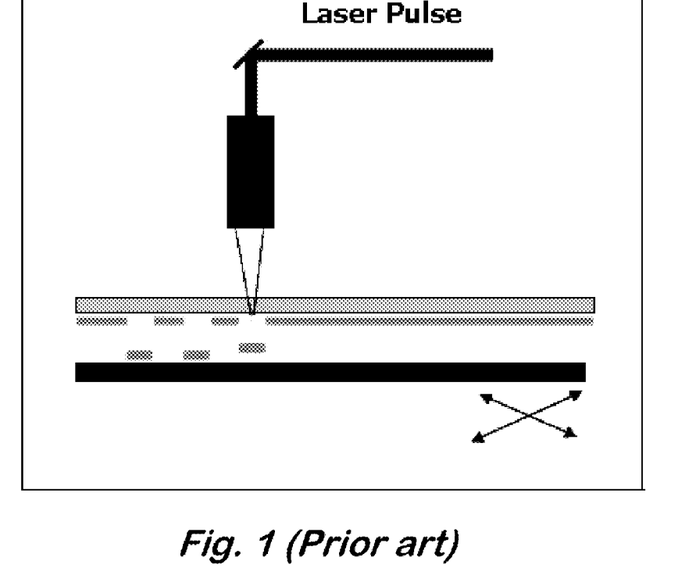
FIG. 1 shows a traditional LIFT schematic. Laser is focused through a transparent quartz support onto the quartz-transfer material interface. The adsorption at the interface vaporizes a small fraction of the transfer material, propelling the material onto the receiving substrate below.

Traditional LIFT techniques use a single laser pulse (usually a high power pulsed laser), focused using a lens or microscope objective onto a transparent quartz support (FIG. 1). On the opposite surface of the quartz support, a thin layer of the material to be transferred is deposited. This layer can be a liquid, solid, or gel, and be deposited by any variety of techniques including, but not limited to evaporation, sputtering, CVD, spin coating, doctor blading, and Langmuir-Blodgett. The only major restriction to the transfer material is that it must have a small optical absorption length at the wavelength of the pulsed laser. The laser pulse is absorbed at the quartz/material interface, vaporizing a small volume of the material. The rapid expansion of the vaporized material propels the remainder of the target material forward onto a receiving substrate below. The positions of receiving substrate and target substrate in traditional LIFT techniques are independently controlled, allowing the user to program arbitrarily complex printed material.

Figure 2:
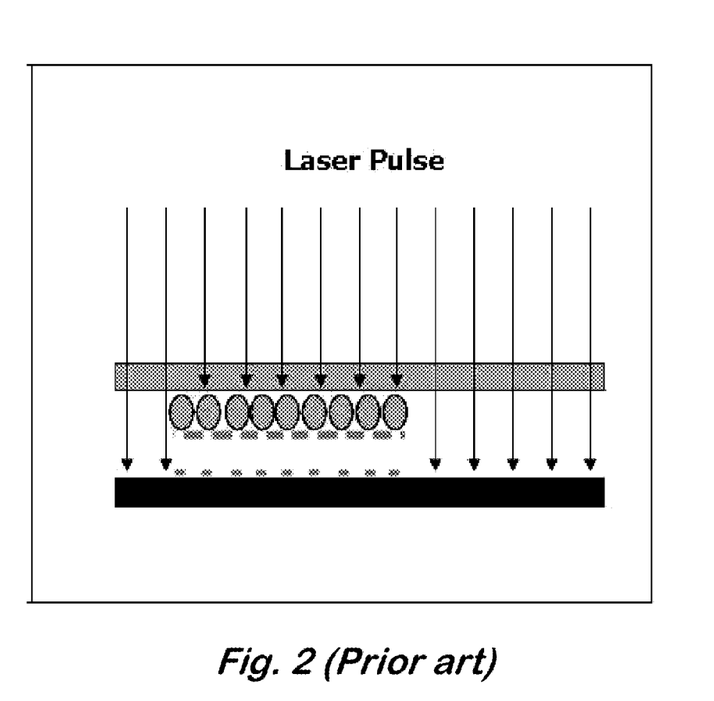
FIG. 2 shows a micro-array LIFT schematic. The laser pulse is incident on a self assembled monolayer of microspheres, on which the transfer layer has been deposited. The microspheres focus the laser pulse, ablating the material off the surface of the sphere and onto a receiving substrate below.

A modified LIFT technique to direct-write a large array of ~1 μm features has also been developed (Landström et al., "Single-step patterning and the fabrication of contact masks by laser-induced forward transfer," *Applied Physics a-Materials Science & Processing* 78(4), 537-538 (2004)). In this technique the focusing element is replaced with a self assembled monolayer of quartz microspheres (FIG. 2). The transfer layer is evaporated directly onto the surface of the microspheres, and the receiving substrate was brought into close contact with the monolayer of beads. The system is uniformly irradiated with a high energy pulsed laser. The light incident on the microspheres is focused, thus ablating the material directly below the microsphere array. The material is transferred in this manner onto the receiving substrate below. The microspheres form a large, close-pack array which covers many $mm^2$ (Denkov et al., "Mechanism of Formation of Two-Dimensional Crystals form Latex Particles on Substrates," *Langmuir* 8, 3183-3190 (1992); Micheletto et al., "A Simple Method for the Production of a Two-Dimensional Ordered Array of Small Latex Particles," *Langmuir* 11, 3333-3336 (1995)). This allows the user to deposit many thousands (perhaps millions) of elements in a single step. In addition, this technique was the first LIFT technique to demonstrate sub-micron patterning. However, the major limitation of this technique is the restriction to materials which can easily be evaporated onto the surface of the spheres. Moreover, the peaks and valleys of the beads make it difficult to deposit a smooth and homogeneous thin film with uniform thickness through traditional methods (CVD, e-beam lithography, spin coating, etc.).

SUMMARY OF THE INVENTION

Disclosed herein is a method comprising: directing a pulse of laser energy though a workpiece comprising: a substrate that transmits the laser energy; a plurality of focusing elements on a surface of the substrate proximal to the source of the laser energy that focus the laser energy; and a coating on the substrate distal to the source of the laser energy that absorbs a portion of the laser energy. Each focusing element focuses the laser energy to a point that removes or ablates a portion of the coating from the substrate to produce a hole in the coating.

Also disclosed herein is an article comprising: a substrate that transmits a predetermined frequency of light; a plurality of focusing elements on a surface of the substrate that focus the predetermined frequency of light; and a coating on the substrate distal to the microspheres that absorbs a portion of the predetermined frequency of light.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Disclosed herein is a method to additively pattern submicron features or devices using a modified laser forward transfer technique. Many micro- and nano-devices (OLEDs, chem/bio sensors, semiconductor lasers/detectors, etc.) are being developed; however the utility of such devices may depend upon their ability to be integrated into larger electronic systems. One of the challenges in sensor/electronic technology is the incompatibility of manufacturing techniques between various system devices (e.g. sensor, power sources, MEMs, and traditional CMOS elements). LIFT is a printing technique used to "drop and place" target material independent of the processing techniques. However, current technology limits the feature size of LIFT to approximately 10 microns. The disclosed method may eliminate many of these restrictions by altering the design of the transfer substrate and optical design to optimize minimum feature size, while maintaining the flexibility in materials processing techniques of traditional LIFT. By moving the beads to the opposite side of the support, the spot size of the focus can be optimized thereby minimizing the minimum feature size obtainable by the focusing element. It is believed that feature sizes as small as, but not limited to, 400 nm are achievable through this optical design.

The method may be a relatively cheap and simple means to obtain large scale patterning and transfer of diverse materials. With a small modification to the experimental setup the technique could be used to print a single feature or device. The transfer of small metallic features can be used as catalysts in chemical vapor deposition. The features would then act as a prepatterned substrate on which materials would grow. This Nano-LIFT technique might also be used to transfer prefabricated MEMs/NEMs and sensor elements to combine into larger systems, or to transfer non-CMOS compatible fabricated devices onto CMOS chips. The transfer targets themselves may serve as excellent optical transmission gratings for building low-cost, high-throughput analytical biochemistry "lab-on-a-chip" systems.

Figure 3:
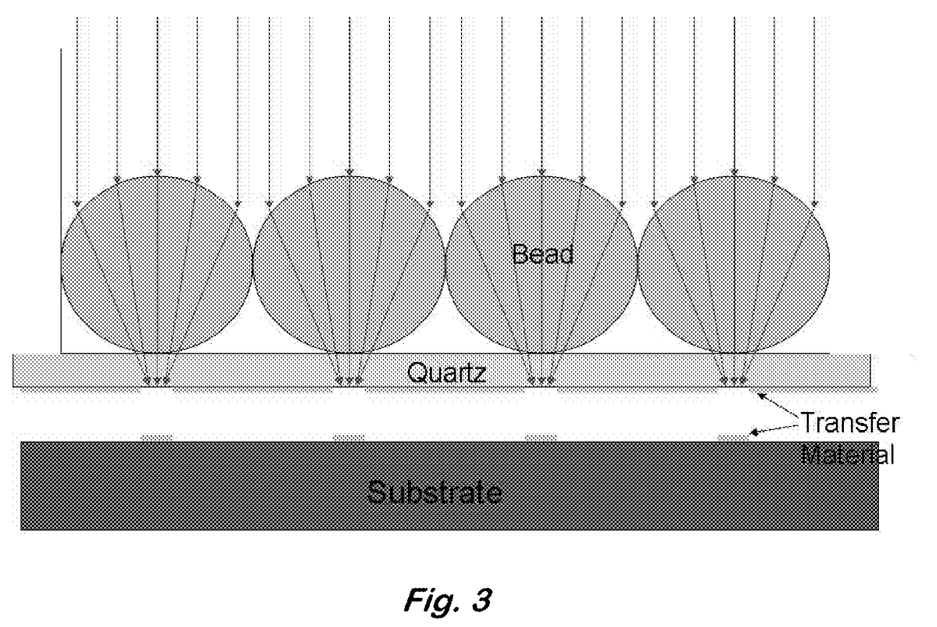
FIG. 3 shows a sub-micron LIFT schematic. Polystyrene microspheres are used as the focusing element and are assembled on one side of an ultra-thin fused quartz support. The transferred material is the deposited on the opposite side of the quartz.

The method may use a self assembled array of polystyrene microspheres whose radius is much larger than the wavelength of the incident laser (r>>λ). The focal length of these spheres is long enough that an ultra-thin fused quartz wafer can be incorporated into the path length of the focus. The focal length of a sphere can be estimated by the equation:

$$f_{sphere} = f \cdot \left(1 - \sqrt{\frac{3 \cdot \lambda}{8 \cdot r} \cdot \frac{n \cdot (3-n) - 1}{n \cdot (n-1)}}\right) \text{ where } f = \frac{r \cdot n}{2(n-1)}$$

where r is the radius and n is the index of refraction of the sphere. Optical quality wafers as thin as 25±5 μm are commercially available (n=1.47 at 800 nm). Therefore, polystyrene beads 113±1.6 μm, 138±2.0 μm, and 156±2.2 μm, whose focal lengths were estimated to be 19.6 μm, 24.0 μm, and 27.1 μm respectively, are suitable for use with the wafer. The index of refraction of polystyrene at 800 nm is approximately 1.59 according to company literature (Duke Scientific). Using these polystyrene beads as the focusing elements, and the ultra thin quartz as a transparent support, a submicron LIFT device may be made (FIG. 3).

The addition of the ultra-thin quartz wafer allows for a wide range of materials to be transferred via the LIFT process. This would include materials which are deposited by techniques such as, but not limited to, spin coating, doctor blading, Langmuir-Blodgett technique, e-beam lithography, or chemical vapor deposition. Multilayers could also be deposited on to the thin quartz support, presenting the possibility for thin film device fabrication on the target. NanoLIFT could then be used to "punch-out" a nanoscale thin film device (z-direction heterogeneity/layers) and deposit it onto the chosen receiving substrate. It may also prove useful in transferring prefabricated complex micro/nanodevices onto other substrates.

The method uses a workpiece that comprises a substrate, a plurality of focusing elements, and a coating. The substrate can transmit the laser energy to a degree sufficient to cause removal or ablation of the coating. The substrate may be up to 100% transparent to the laser energy, though this is not required. A suitable thickness of the substrate may depend on % transmittance of the material used in the substrate. An example substrate may be a quartz substrate for use with a Ti-sapphire laser ($\lambda$=800 nm).

The focusing element may be any lens or object that focuses the laser to a point in or near the coating. The focal point may be at or near the interface between the substrate and the coating. The focusing elements may be microspheres. The term "microsphere" is not used to imply perfect spheres as they need not be perfectly spherical and may be oblate, as long as they performing the proper focusing. The substrate may have a close-packed monolayer of monodisperse microspheres over a portion of the surface or the entire surface of the substrate. Such microspheres may have a diameter from nanometers to about a millimeter, including 5 µm and 100's of µm. Another suitable type of focusing element is a micron-sized convex lens.

The focusing elements may be made of any material that allows for proper focusing, including but not limited to, polystyrene or silica. The focusing elements may be up to 100% transparent to the laser energy, though this is not required.

The coating absorbs a portion of the laser energy or substantially all of the laser energy. The amount of absorption required is that which causes removal or ablation of the coating. Only a portion of the coating that is exposed to the laser may be removed or additional adjacent portions of the coating that were not exposed may be removed depending on the mechanical and heat transfer characteristics of the coating. The laser and coating (material and thickness) may be chosen so that the removed or ablated portion conforms as much as possible to the area exposed to the laser energy.

A hole in the coating is left behind after the portion is removed or ablated. This hole may be smaller than the focusing element. For example, it may be an approximately circular hole having a smaller diameter than the microsphere that produced it. The hole, and consequently any transferred portion, may be, for example, less than 1 µm in diameter.

The coating may be a single layer of a material or it may have more than one layer of different materials. For example, the coating may be a layer of titanium on the substrate and a layer of chromium or gold on the titanium. This allows for the transfer of a spot of a multilayer composite of Ti and Cr/Au to another substrate. The coating may be designed such that the transferred spot is an electronic or optical device, such as a thin film device, a semiconductor device, a laser, a battery, or a sensing element. Materials used in the coating may include, but are not limited to, metals, metal oxides, semiconductors, organics, polymers, biological materials, and active biological materials such as proteins, peptides, DNA, and antibodies.

Any laser energy source that causes the removal or ablation of the coating may be used. The laser may be, for example, a femtosecond or nanosecond pulsed laser. Faster pulses may produce cleaner holes and transfers.

Suitable laser, substrates, and coatings may include, but are not limited to, any of those generally used in LIFT or the modified LIFT described above, as well as those disclosed in Chrisey et al., U.S. Pat. No. 6,177,151 and any other references cited throughout this application.

In some embodiments the laser energy is directed through a mask before the workpiece. This allows for only a subset or even just one focusing element to be exposed to the laser. Alternatively, no mask may be used, so that the laser is directed through all the focusing elements that are within the path of the laser energy, which may include all the focusing elements on the substrate.

In some embodiments the method is used to transfer portions of the coating to a receiving substrate. This may be done by placing the receiving substrate adjacent to the workpiece and distal to the source of laser energy. The removed portion of the coating forms a deposit on the receiving substrate. By using a mask, a single deposit may be made or an array or pattern of deposits may be made simultaneously by a single pulse. The receiving substrate may be in contact or very close proximity to the coating, such as within about 100 µm.

In another embodiment, it is not necessary to capture the removed coating. After forming desired holes in the coating, the focusing elements are removed. This may produce a nano-hole array exhibiting ultra-high transmission. When a second light is directed through the workpiece, the transmittance of the second light may be greater than 100% normalized to the total area of the holes within the path of the second light. This may cause a change in the wavelength of the transmitted second light.

Figure 4:
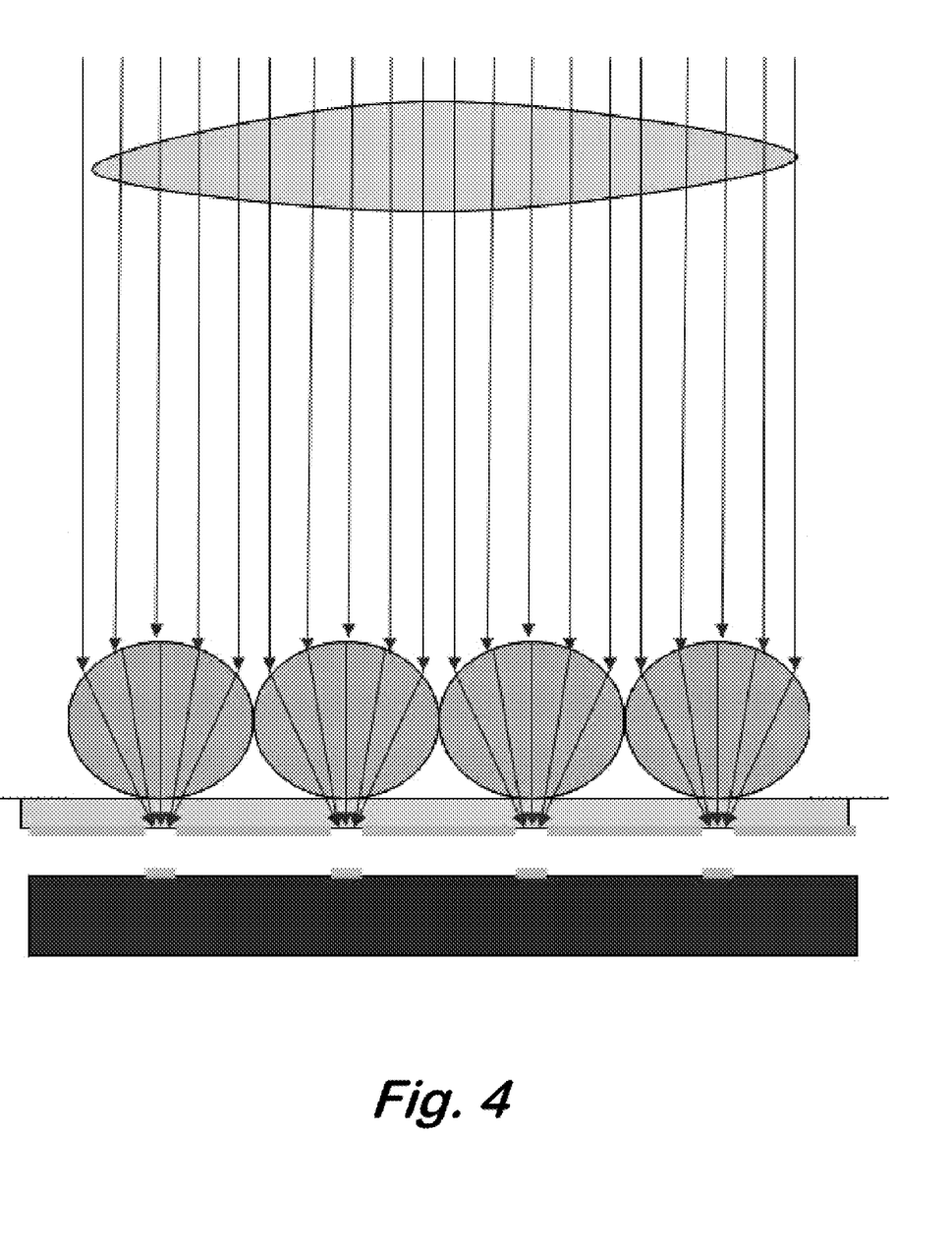
FIG. 4 shows a LIFT design with added lens for fine adjustment of the focal distance.

An additional lens may be incorporated, creating a compound lens system. This further allows the operator to tune the focal length of the system to minimize the transferred feature size (FIG. 4).

Having described the invention, the following examples are given to illustrate specific applications of the invention. These specific examples are not intended to limit the scope of the invention described in this application.

EXAMPLE 1

Formation of holes—After using ray tracing to estimate the radius of sphere needed to achieve a focal length to match the thickness of the quartz, it was decided to test three sizes of polystyrene microspheres 113±1.6 µm, 138±2.0 µm, and 156±2.2 µm. Using these polystyrene spheres as the focusing elements and the ultra thin quartz as a transparent support, a "nano-LIFT" apparatus was constructed as shown schematically in FIG. 3.

The transfer layer of titanium and chrome or gold was evaporated onto the ultra thin quartz using a Temescal e-beam evaporator (BOC Edwards, Wilmington, Mass.). To form the microsphere array, the substrate was first adhered to an aluminum support using contact cement. The fused silica wafers were 1 cm² windows that were lapped and polished to 25±5 µm thick. The aluminum support had an 8 mm diameter hole bored in the center to which the fused silica wafer was adhered. The well formed by the walls of the aluminum support was then filled with 400 µL of monodisperse polystyrene beads suspended in a water and surfactant solution (Duke Scientific, Freemont, Calif.). An additional 20 µL of 0.2% sodium dodecyl sulfate (SDS) was added to reduce adhesion between the aluminum support substrate and the polystyrene microspheres. The suspension liquid was allowed to evaporate over a period of hours, during which the polystyrene spheres self assemble into a close-packed hexagonal pattern (Denkov et al., *Langmuir* 8, 3183 (1992); Micheletto et al., *Langmuir* 11, 3333 (1995)).

The microsphere arrays were exposed to a single laser pulse from a Spectra Physics Hurricane (Irvine, Calif.) femtosecond laser system in atmospheric conditions. The laser pulse had a wavelength of 800 nm, a pulse length of approximately 130 fs, a beam width of 5 mm, and an energy which was varied from 1.0 mJ/pulse down to 0.03 mJ/pulse using neutral density filters. A scanning electron microscope (SEM) was used to image the holes formed on the thin metal film after exposure to the incident laser pulse. The size of the ablated holes was measured as well as the spacing of the holes to see how the variability in the beam energy (Gaussian beam distribution) as well as the variation of the thickness of the quartz targets affected the size of the ablated material. The morphology and topography of the deposited metallic features was investigated using SEM and the contact mode of an atomic force microscope. The surface composition of the deposited features was determined using scanning Auger electron spectroscopy (AES), a surface sensitive technique capable of detecting localized variations in the surface elemental composition.

Figure 5:
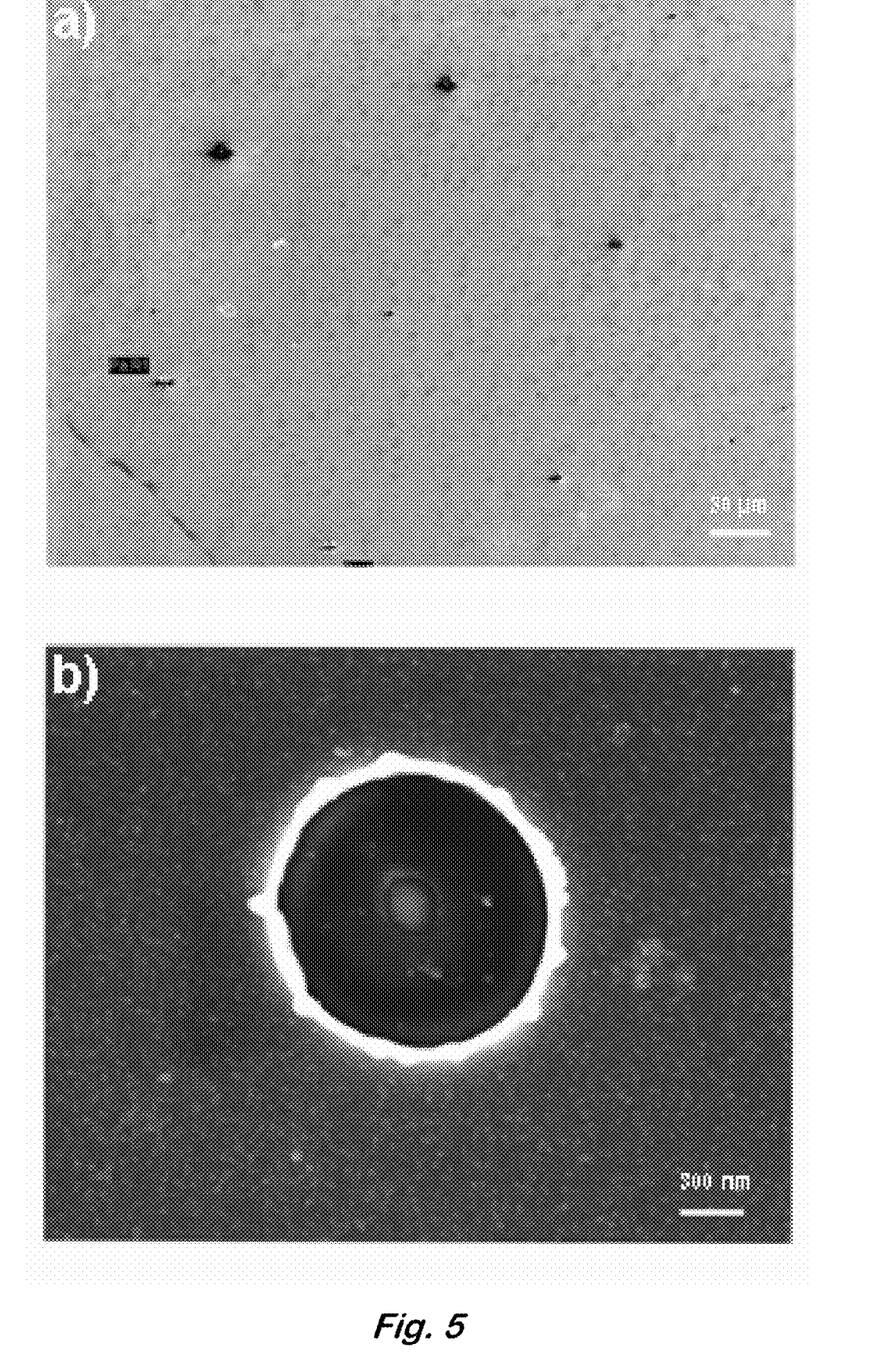
FIG. 5 shows ablation of the transfer film due to the focusing of the laser beam by the polystyrene microspheres. (a) Hexagonal ablation pattern caused by a 113 μm diameter microsphere array. (b) Close up of an ablated hole in an 80 nm thick titanium film due to the focusing of a laser pulse by a 138 μm diameter microsphere.

FIG. 5 shows representative ablated holes in a 40 nm thick chrome target due to the input laser beam. FIG. 5a is the ablation pattern caused by a bead array with spheres of diameter 113±1.6 µm. The microspheres were irradiated with a singe 130 fs pulse with a fluence of 3 mJ/cm$^2$. The holes in the metallic film were large and somewhat irregular because the focal length of the sphere was shorter than the thickness of the quartz support. The smallest and most uniform ablated holes were obtained using the 138 µm diameter microspheres. This result was in line with estimations of the focal length from ray tracing. FIG. 5b shows an example of a high magnification SEM image taken of a hole in an 80 nm thick titanium film caused by the focusing of a 138 µm microsphere. The bead in this image was exposed to a laser fluence of 0.12 mJ/cm$^2$. By varying the incident energy of the incident laser beam, a range in the diameter of these ablated holes has been demonstrated from 5 µm down to 480 nm. These results demonstrate a large range in potential transferred feature size that can be printed using this optical design.

EXAMPLE 2

Figure 6:
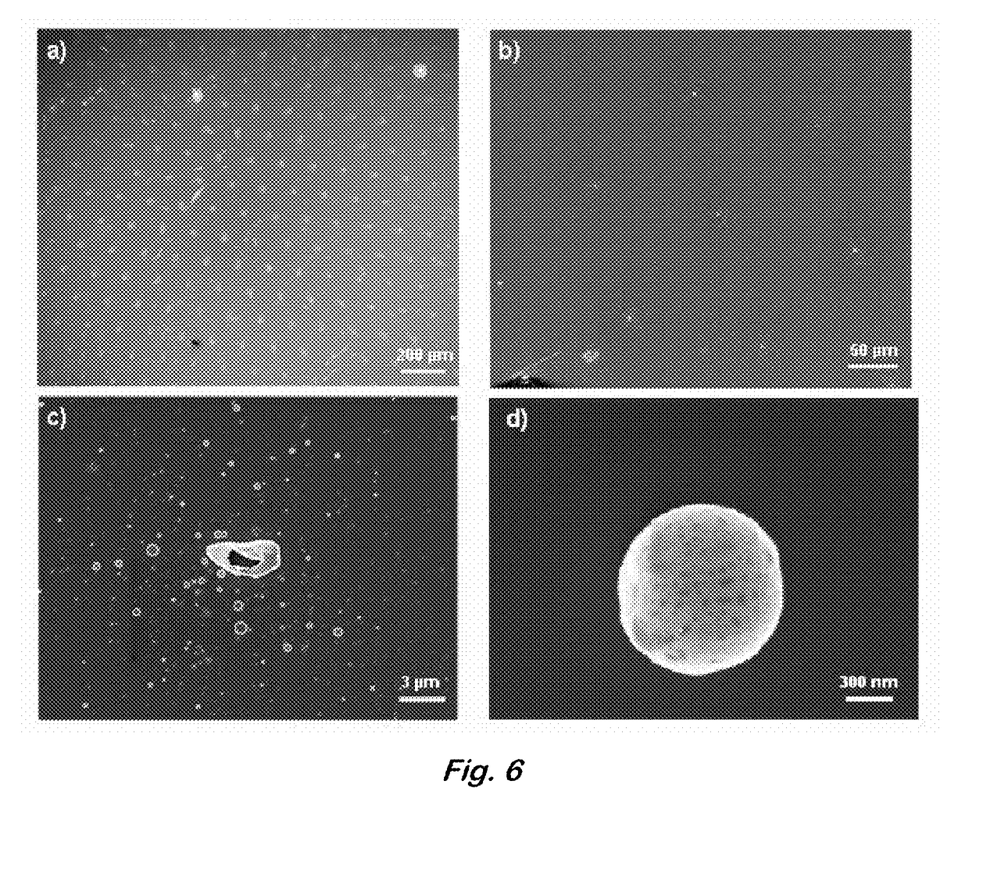
FIG. 6 shows SEM images of material transferred via the nano-LIFT technique. (a) Image demonstrating the large scale transfer of a 5 nm Ti, 80 nm Cr transfer layer. (b) Higher resolution image of high quality LIFT transfer also of a 5 nm Ti, 80 nm Cr sample. (c) Close up of one of the large metallic features printed in FIG. 3b. (d) Au transfer feature from a 400 nm thick Au film.

Transfer of material—The quality of the transferred material depends upon the energy of the incident laser pulse, the optical and thermal transport properties of the transfer film, and the distance between the target substrate and the receiving substrate. Transferred material is collected by placing the receiving substrate in close contact with the target substrate. FIG. 6a demonstrates the large scale transfer of material using the apparatus outlined in FIG. 3, using 138±2.0 µm spheres. The transfer target used in this demonstration was a 5 nm thick titanium film coated in 80 nm of chromium. This large scale image is not indicative of the minimum size capable by this method. In fact, finer features are difficult to image on this scale, such as those shown in FIG. 6b where an array of small structures were formed with less debris. FIG. 6c shows a higher resolution image of a large metallic feature transferred via the nano-LIFT technique. There is a clear region of direct-write transfer of a large feature surrounded by a spray of molten material. The large patterns shown in FIG. 6a were printed at higher laser fluence (3.0-5.1 mJ/cm$^2$) and were comprised of diffuse material. Further reduction in laser fluence resulted in the transfer of single metallic features with little surrounding diffuse material, as shown in FIG. 6d, which clearly shows that under the proper material and laser parameters, this technique can produce entirely clean, nm-scale forward transfer features.

The finer direct-write features of FIGS. 6b and d were found only at lower laser fluence <1.5 mJ/cm$^2$, and usually in a narrow band around the perimeter of the transfer area due to the intensity profile of the beam. When the energy of the incident beam was reduced by another factor of two, the transfer layer was no longer ablated from the target substrate, indicating that it had dropped below the ablation threshold of the transfer layer. With a flat laser intensity profile and finer control of the beam energy, it should be possible to extend the high resolution printing of FIG. 6b over the entire illuminated beam area (mm$^2$). The minimum feature size obtainable via this technique may be limited by the wavelength of the laser used, and by the thermal transport properties of the transfer film, but as shown here sub-micron arrays of ablated holes and respective forward transfer features have been obtained.

Figure 7:
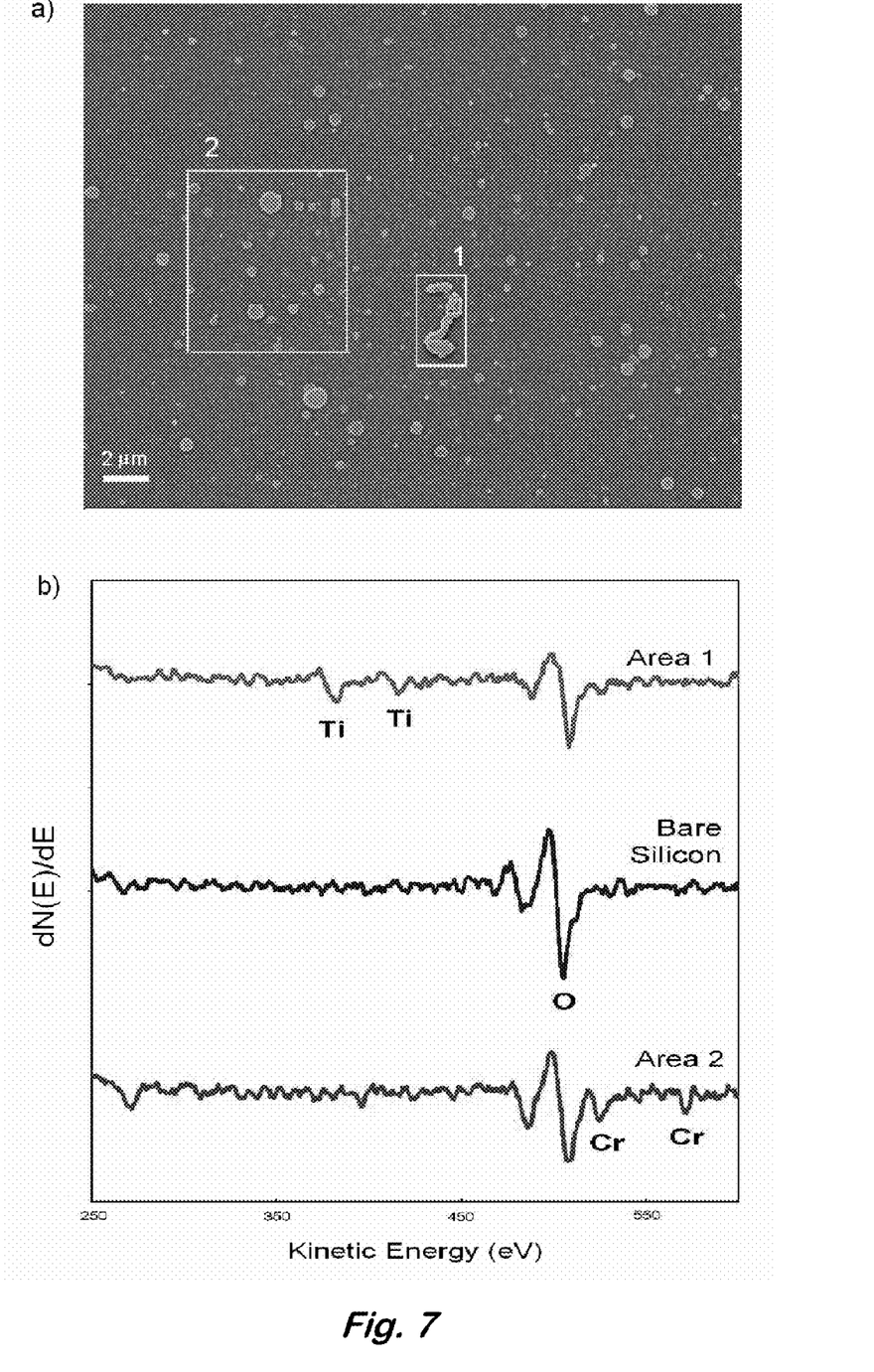
FIG. 7 shows (a) SEM image taken from the submicron LIFT transfer from a 5 nm Ti, 80 nm Cr target layer. Area 1 is a large metallic feature transferred via our patterning method. Area 2 is the area scanned to achieve an average composition of the molten transfer. (b) Auger electron spectroscopy of different areas on FIG. 7a. The large metallic feature of Area 1 has a strong Ti signal, while the molten material is primarily composed of Cr.

The transferred regions from the sample shown in FIGS. 6b and c were characterized with scanning AES. A hemispherical analyzer was used to measure the energy distribution of emitted electrons, N(E), while scanning a 5 keV electron beam over the area of interest. FIG. 7 show AES spectra, dN(E)/dE, of three different regions taken from a LIFT sample. The first region (Area 1, FIG. 7a) is a large metallic feature transferred via the submicron LIFT technique from a 5 nm titanium, 80 nm chromium transfer layer using a 1.5 mJ/cm$^2$ laser pulse. The AES spectra indicates a strong presence of Ti, although the Ti layer represents <6% of the total transfer layer. The presence of titanium on the surface indicates that the feature was directly transferred from the target substrate to the receiving substrate maintaining the composition of the interfacial Ti layer of the sample. Additional spectra were taken of the debris material surrounding the transfer, Area 2 of FIG. 7a. This particular forward transfer feature was chosen for further study via AES because of its interesting two-phase nature (molten in Area 2 and solid in Area 1). Chrome samples under these conditions appear to produce more thermal debris than gold (see below). The morphology of these drops indicate that they were ejected as a molten spray, and the AES spectra of a large number of these features indicates they are predominantly composed of Cr, with no measurable Ti signature. The scanning AES data therefore suggests that there are two types of Cr nano-LIFT transfers: one non-thermal event where an intact two layer disc is deposited (Ti on top of Cr) and one thermal event where the two layers are mixed, leaving a molten droplet where the surface is comprised predominantly of the major component (Cr). The initial absorption of the laser pulse may result in the creation of a plasma followed by a shock wave event, and this may result in the deposition of the large chunk of material. However the remaining heat may diffuse into the layer and thermal effects can persist for hundreds of nanoseconds (Albert et al., *Applied physics A, Materials science & processing* 76, 319 (2003); Konig et al., *Optics Express* 13, 10597 (2005); Willmott et al., *Reviews of Modern Physics* 72, 315 (2000); Amoruso et al., *Applied Physics Letters* 92 (2008)), which can lead to a secondary event where smaller hot material particles are emitted.

The most uniform metallic features achieved were transferred from gold films 400 nm thick. FIG. 6d shows a representative transfer of a gold nano-feature printed from a film composed of 5 nm titanium and 400 nm gold, using 138 µm microspheres and a laser fluence of 2.0 mJ/cm$^2$. The transfers were single features surrounded by little to no debris. The clean nature of these transfers is in stark contrast to the Cr results where significant molten debris was found around a solid transfer spot (FIGS. 6a-c). AFM was used to investigate the topology and aspect ratio of the transferred nanoparticles. The transferred features were measured to be 175±25 nm thick (approximately ½ as thick as the target layer). This thickness was in good agreement with the smallest feature sizes found in both the target holes and the transferred features obtained with these films. The smallest hole found in the gold target was approximately 480 nm in diameter, however the smallest transfer found from this film was found to be approximately 900 nm in diameter. Both the increased diameter and reduced thickness indicate that the Au transfers are significantly flattened during transfer.

Obviously, many modifications and variations of the present invention are possible in light of the above teachings. It is therefore to be understood that the claimed invention may be practiced otherwise than as specifically described. Any reference to claim elements in the singular, e.g., using the articles "a," "an," "the," or "said" is not construed as limiting the element to the singular.

What is claimed is:

1. A method comprising:
   directing a pulse of laser energy though a workpiece comprising:
   a substrate that transmits the laser energy;
   a plurality of focusing elements on a surface of the substrate proximal to the source of the laser energy that focus the laser energy; and
   a coating on the substrate distal to the source of the laser energy that absorbs a portion of the laser energy;
      wherein each focusing element focuses the laser energy to a point that removes or ablates a portion of the coating from the substrate to produce a hole in the coating.

2. The method of claim 1, wherein the diameter of the hole is less than 1 µm.

3. The method of claim 1, wherein the focusing elements are microspheres.

4. The method of claim 3, wherein the diameter of the hole is less than the diameter of the microsphere.

5. The method of claim 3, wherein the microspheres form a close-packed monolayer of monodisperse microspheres over a portion of the surface.

6. The method of claim 1, wherein the laser energy is directed through all of the focusing elements that are in within the path of the laser energy.

7. The method of claim 1;
   wherein the laser energy is directed through a mask before the workpiece; and
   wherein the mask is configured so that the laser energy is directed through only a subset of the focusing elements or through only one of the focusing elements.

8. The method of claim 1, wherein the coating comprises more than one layer of different materials.

9. The method of claim 1, wherein the coating comprises:
   a layer of titanium on the substrate; and
   a layer of chromium or gold on the titanium.

10. The method of claim 1, wherein the substrate is a quartz substrate.

11. The method of claim 1, wherein the microspheres comprise polystyrene.

12. The method of claim 1, further comprising:
    placing a receiving substrate adjacent to the workpiece and distal to the source of the laser energy;
       wherein the removed portion of the coating is transferred to the receiving substrate to form a deposit.

13. The method of claim 12, wherein an array of the deposits are formed on the receiving substrate by a single pulse of the laser energy.

14. The method of claim 12, wherein a single deposit is formed on the receiving substrate.

15. The method of claim 12, wherein the deposit is an electronic or optical device.

16. The method of claim 15, wherein the device is a thin film device, a semiconductor device, a laser, a battery, or a sensing element.

17. The method of claim 1, further comprising:
    removing the focusing elements from the workpiece.

18. The method of claim 17, further comprising:
    directing a second light through the workpiece;
       wherein the transmittance of the second light is greater than 100% normalized to the total area of the holes within the path of the second light.

19. An article comprising:
    a substrate that transmits a predetermined frequency of light;
    a plurality of focusing elements on a surface of the substrate that focus the predetermined frequency of light; and
    a coating on the substrate distal to the microspheres that absorbs a portion of the predetermined frequency of light.

20. The article of claim 19, wherein the focusing elements form a close-packed monolayer of monodisperse microspheres over a portion of the surface.

21. The article of claim 19, wherein the coating comprises more than one layer of different materials.

22. The article of claim 21, wherein a portion of the more than one layers is an electronic or optical device.

23. The article of claim 22, wherein the device is a thin film device, a semiconductor device, a laser, a battery, or a sensing element.

24. The article of claim 19, wherein the coating comprises:
    a layer of titanium on the substrate; and
    a layer of chromium or gold on the titanium.

25. The article of claim 19, wherein the substrate is a quartz substrate.

26. The article of claim 19, wherein the microspheres comprise polystyrene.

* * * * *